April 20, 1943.  P. L. CRITTENDEN ET AL  2,317,135
DRIVE MECHANISM
Filed June 21, 1941
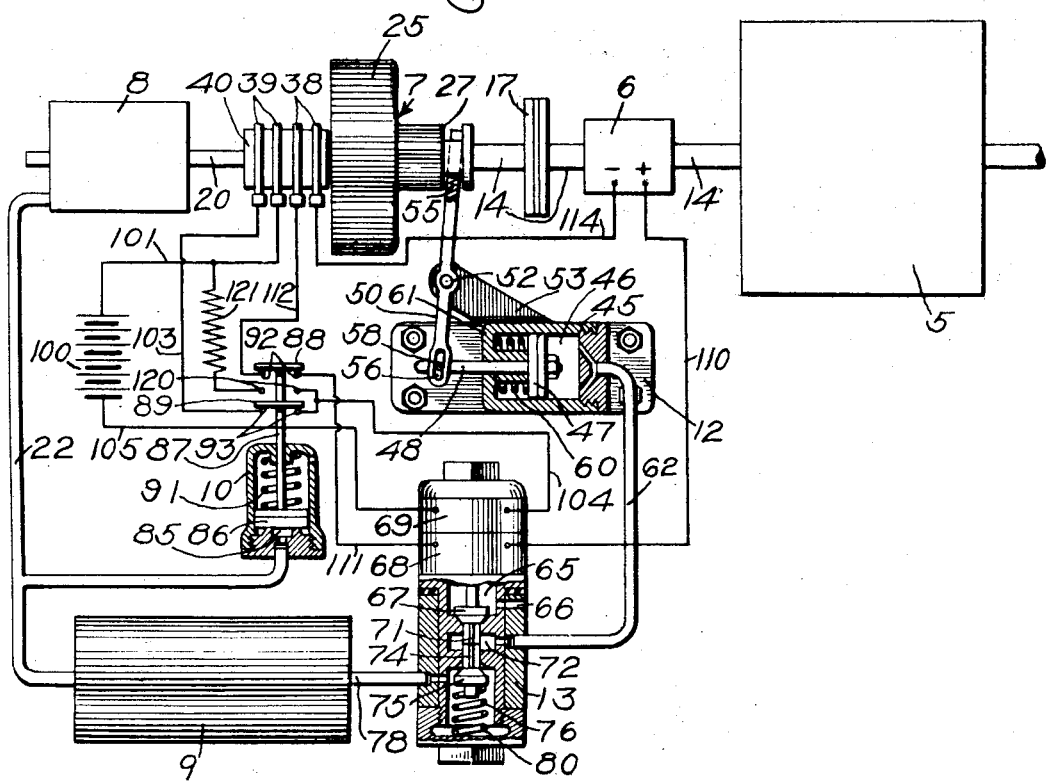
Fig. 1.
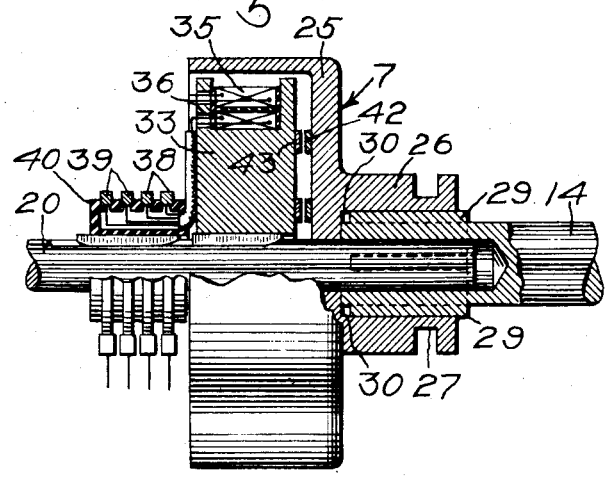
Fig. 2.
INVENTORS
PHILIP L. CRITTENDEN
CLAUDE M. HINES
BY
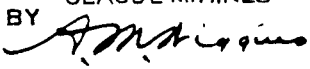
ATTORNEY Patented Apr. 20, 1943

2,317,135

UNITED STATES PATENT OFFICE 2,317,135

DRIVE MECHANISM

Philip L. Crittenden, Edgewood, and Claude M. Hines, Pittsburgh, Pa., assignors to The Westinghouse Air Brake Company, Wilmerding, Pa., a corporation of Pennsylvania Application June 21, 1941, Serial No. 399,056

10 Claims. (Cl. 172—239)

This invention relates to power transmissions, and more particularly to an electromagnetic drive or clutch mechanism for a compressor.

In order to utilize the energy delivered by a variable speed motor or engine for driving a compressor at a relatively constant speed, it has been proposed to employ an electromagnetic transmission or drive mechanism which is adapted to respond to variations in the speed of the driving motor or engine for correspondingly adjusting the amount of slip, or lag in the speed of the compressor with respect to that of the driving motor.

The principal object of the present invention is to provide auxiliary friction clutch means which may be constructed and arranged as an integral feature of an electromagnetic transmission or drive mechanism, and which is automatically operable to establish a mechanical driving connection between the motor or engine and the compressor in the event of failure of the operating elements of the electromagnetic drive mechanism.

Other objects and advantages of the invention will appear in the following more detailed description thereof, taken in connection with the accompanying drawing, in which Fig. 1 is a diagrammatic view, partly in section of an electromagnetic drive mechanism constructed in accordance with our invention; and Fig. 2 is a fragmentary enlarged detail view, mainly in section, of the combination magnetic and friction clutch device forming part of the apparatus shown in Fig. 1.

Referring to the drawing, the equipment as illustrated in elementary form in Fig. 1 comprises a motor or Diesel engine 5, a direct current generator 6, an electromagnetic clutch device 7, a fluid compressor 8, a reservoir 9 for receiving fluid compressed by the compressor, a governor switch 10, and auxiliary friction clutch controlling apparatus including an actuator device 12 and a magnet valve device 13.

The engine 5 is provided with a drive shaft which is indicated generally by the reference character 14, and which is operatively connected to the direct current generator 6 for driving the generator at a speed corresponding to that of the engine. The drive shaft 14 is also operatively connected in a manner hereinafter explained to the electromagnetic clutch device 7. A reducing gear assembly 17 may be interposed in the portion of the drive shaft 14 between the electromagnet clutch device 7 and the generator 6.

The compressor 8 may be of any suitable type having a rotary shaft 20 which is adapted to be driven through the medium of the electromagnetic clutch device 7 for operating the compressor to supply compressed air by way of a pipe 22 to the reservoir 9.

Referring to Fig. 2, the electromagnetic clutch device 7 includes a cup-shaped driving member 25, which is constructed of a suitable material in which eddy currents may be freely induced. The driving member 25 has a sleeve portion 26 having an annular groove 27, and an interiorly disposed bore into which extends the end of the drive shaft 14. The drive shaft 14 has formed thereon a plurality of longitudinally disposed spline portions 29, which are fitted in sliding engagement with interior grooves 30 provided in the wall of the bore within the sleeve portion 26, so that the cup-shaped driving member 25 is adapted to be rotated with the drive shaft 14 but may be shifted longitudinally with respect to the shaft, in a manner hereinafter explained. The electromagnetic clutch device 7 further comprises a driven element or rotor 33, which is suitably keyed to the compressor shaft 20 in concentric alignment with the cup-shaped driving member 25, which is adapted to be normally driven in spaced relation with respect to the rotor 33. Mounted on the rotor 33 are two magnet windings 35 and 36, one of which has terminals connected to a pair of slip rings and brushes 38 and the other of which has similar terminals connected to an adjacent pair of slip rings and brushes 39, both sets of slip rings being mounted on an insulating member 40 that is suitably keyed to the compressor shaft 20.

The associated magnet windings 35 and 36 are disposed on the rotor 33 in bucking or opposing relation, the winding 35 being adapted when energized to produce a predominant flux tending to counteract that produced by the winding 36, during operation of the apparatus as hereinafter described. It will be understood that the resultant or effective flux maintained in the rotor 33 will be effective to induce eddy currents in the driving member 25.

According to our invention, the driving member 25 is arranged to be shifted into frictional driving relation with the rotor 33 in the event of failure of the electrical transmission means, and for this purpose is provided with an annular friction surface 42, which is disposed on the face of the driving member adjacent a similar friction surface 43 carried by the rotor 33. The actuator device 12, shown in Fig. 1, is provided for shifting the driving member 25 longitudinally with respect to the drive shaft 14.

The actuator device 12 is adapted to be suitably mounted in a fixed position adjacent the electromagnetic clutch device 25, and comprises a casing structure 45 having formed therein a piston bore 46 containing a piston 47, which is operatively connected to the driving member 25 of the clutch device through the medium of a piston rod 48 and an operating lever 50. The operating lever 50 is pivotally mounted intermediate its ends on a pin 52 carried by a bracket portion 53 of the casing structure 45, and has formed on one end thereof a clevis portion 55 and at the opposite end is provided with a longitudinal slot 56. The clevis portion 55 of the lever 50 is operatively disposed within the groove 27 of the driving member 25, and the slot 56 in the other end of the lever is adapted to receive a pin 58 carried by the end of the piston rod 48.

A coil spring 60 is interposed between the piston 47 and an end wall 61 of the casing structure 45 for urging the piston toward an operative position, in which position the force of the spring would be transmitted through the medium of the piston rod 48 and lever 50 for shifting the driving member 25 of the clutch device 7 into its frictional driving position, as hereinafter explained. Under normal conditions, however, the piston 47 is adapted to be held in an inoperative position, as shown in Fig. 1, under the pressure of air supplied to the piston bore 46 by way of a pipe 62 in accordance with operation of the magnet valve device 13.

The magnet valve device 13 comprises a casing structure having formed therein a valve chamber 65, which communicates with the atmosphere by way of a port 66 and contains a release valve 67 that is adapted to be normally held in seated position under the force exerted by either or both of a pair of electromagnets 68 and 69. The valve 67 has a fluted stem 71, which extends through a suitable bore into a central chamber 72 communicating with the pipe 62, and is adapted to engage a similar fluted stem 74 of a supply valve 75 that is mounted in a chamber 76 formed in the casing structure. The supply valve 75 is normally disposed in unseated position, so long as the other valve 67 is held in seated position under the force of either of the electromagnets 68 or 69, in which position communication is maintained from the reservoir 9 to the pipe 62 by way of a pipe 78, the chamber 76 and chamber 72. A coil spring 80 is interposed between the supply valve 75 and the lower end wall of the chamber 76 for urging the supply valve and the release valve 67 toward their seated and unseated positions, respectively.

The governor switch 10 comprises a casing having a piston chamber 85 in which is slidably mounted a piston 86, which has an upwardly extending stem 87 carrying a pair of contact members 88 and 89. The piston 86 is subject to the pressure of fluid supplied to the chamber 85 from the pipe 22, and to the opposing force exerted by a coil spring 91. This spring is designed to bias the piston downwardly in order to maintain the contact member 88 in bridging relation with a pair of contact elements 92 and the contact member 89 in bridging relation with a pair of contact elements 93, so long as the pressure of air in the reservoir 9 remains below a predetermined value.

Operation

When the equipment shown in Fig. 1 is in condition for operation, with the governor switch device 10 positioned as shown, both the electromagnet 69 of the magnet valve device 13 and the winding 35 of the electromagnetic clutch device 7 are constantly energized through the medium of a circuit which includes the positive terminal of a battery 100, a conductor 101, the brush and collector ring assembly 39 which is connected to the winding, a conductor 103, the switch contact elements 89 and 93, a conductor 104, the electromagnet 69, and a return conductor 105 leading to the negative terminal of the battery. With the magnet 69 thus energized, the valves 67 and 75 are held in their respective seated and unseated positions, as shown in Fig. 1.

Assuming that the engine 5 is operated to drive the shaft 14 and the direct current generator 6, current is supplied thereby through a circuit which includes a conductor 110, the electromagnet 68 of the magnet valve device 13, a conductor 111, the switch contact elements 88 and 92, a conductor 112, the brush and collector ring assembly 38 and the connected winding 36 of the clutch device 7, and a return conductor 114 leading back to the generator. As already explained, the connections between the battery 100 and the winding 35 of the clutch device 7, and the connections between the generator 6 and the winding 36, are such that the constant flux produced by the winding 35 always opposes and predominates over the flux produced by the winding 36, the two flux forces being thus maintained in bucking relation. Consequently, if the current supplied by the generator to the winding 36 is increased, the resultant flux produced by the opposed windings decreases; and if the energization of the winding 36 is decreased, the resultant flux increases.

Upon rotation of the driving member 25 by the engine driven shaft 14, eddy currents are set up in the driving member as it revolves in the field established by the windings 35 and 36, with the result that the rotor 33 is subjected to torque causing it to follow the driving member, thereby effecting operation of the compressor 8. It will be apparent that since the rotor 33 carrying the windings is caused to rotate by the magnetic drag exerted through the medium of the driving member 25, the relative difference in speed, or slip, between the two elements is determined by the strength of the resultant magnetic field produced by the opposed windings 35 and 36, which field is in turn governed by the speed of the generator 6. This operating characteristic of the magnetic clutch device 7 is utilized to effect operation of the compressor 8 at a relatively constant speed, despite variations in the speed of the driving engine 5.

Fluid under pressure is meanwhile supplied from the reservoir 9 by way of the pipe 78, past the unseated valve 75, and through pipe 62 to the piston chamber 46 of the actuator device 12, so that the piston 47 is held in its normal position for maintaining the driving member 25 out of frictional engagement with the rotor 33. It will be remembered that the valve 75 is maintained in its open position so long as either or both of the electromagnets 68 and 69 are energized through the medium of the respective generator and battery circuits.

When the pressure of fluid supplied to the reservoir 9 is built up to a predetermined value, the corresponding fluid pressure in the chamber 85 of the governor switch device 10 becomes effective to move the piston 86 upwardly against the force of the spring 91, so that the switch contact member 88 is moved away from the contact element 92 while the switch contact member 89 is carried into contact with a pair of contact elements 120. The circuits for both windings of the electromagnetic clutch device 7 are thus broken, and upon the resultant withdrawal of the magnetic field previously maintained between the driving and driven elements of the clutch device, the compressor 8 is rendered inoperative. At the same time, the magnet 69 of the magnet valve device 13 is still energized by current supplied from the battery 100 by way of the conductor 101, a resistance 121, the contact elements 89 and 120, and the conductors 104 and 105. The valve 75 is consequently held in its unseated position for maintaining the supply of compressed air to the piston chamber 46 of the actuator device 12.

By reason of the construction and arrangement of the electromagnetic transmission system to embody the improvements and safety features provided in our invention, the compressor 8 is adapted for operation by the engine 5 to maintain the desired pressure in the reservoir 9 even in the event of failure of one or more electrical elements of the drive equipments.

To assume one possible condition, if either the winding of the clutch device 7 that is energized by the battery 100, or the other winding which is energized by means of the generator 6, should become inoperative or ineffective, the intact winding remaining energized will continue to produce flux providing the magnetic interlock between the driving and driven elements of the clutch device, although in this case the slip between the elements would be eliminated, since the field established by a single winding would be relatively strong in the absence of the opposing flux ordinarily produced by the ineffective winding.

Under the condition of operation just described, wherein one or the other of the windings of the electromagnetic clutch device 7 becomes ineffective, it will be evident that, with the governor switch device 10 in its lower circuit closing position as shown, the magnet valve device 13 will remain in the energized condition illustrated, since one of the magnet coils 68 and 69 is connected in the still complete circuit in which the sound winding is included. When the governor switch device 10 is operated in response to an increase in the pressure of air in the reservoir 9 to the predetermined maximum value, the single operative winding in the clutch device 7 is then deenergized, thus disestablishing the magnetic driving connection between the engine and compressor, while with contact elements 93 and 120 engaged the magnet valve device 13 is again energized through the medium of the auxiliary circuit hereinbefore described, so that the actuator device 12 is held in the position shown. It will thus be seen that so long as at least one of the windings of the electromagnetic clutch device 7 remains operable, that device is operative to maintain the inductive or magnetic drive connection between the engine 5 and the compressor 8, while the friction clutch elements associated therewith are inoperative.

The friction clutch mechanism of our improved drive equipment is always available, however, for operation of the compressor in the event of accidental failure and deenergization of both of the magnetic windings of the clutch device 7. If the winding 35 fails and becomes ineffective to transmit current from the battery 100 through the circuit including the magnet 69, while the governor switch device 10 is positioned as shown in Fig. 1, the magnet 69 cannot be energized. Similarly, the other magnet 68 is deenergized if the magnetic winding 36 in the clutch device 7, or any other element of the circuit normally supplied with current by the generator 6, is rendered ineffective. With both magnets 68 and 69 of the magnet valve device 13 thus simultaneously deenergized, the spring 80 becomes operative to shift the valves 75 and 67 to their respective seated and unseated positions, so that air under pressure is vented from the piston chamber 46 of the actuator device 12 by way of the pipe 62, past the unseated valve 67 and through the chamber 65 and port 66.

When air is released from the piston chamber 46, the spring 60 is rendered effective to shift the piston 47, stem 48 and pin 58 to the right, as viewed in Fig. 1, thereby operating the lever 50 about the pivot pin 52 to force the driving member 25 of the clutch device 7 into frictional engagement with the rotor 33 secured to the compressor shaft 20. A direct frictional drive connection is thus established between the engine 5 and the compressor 8.

Assuming that the necessary circuit between the battery 100 and the magnet 69 of the magnet valve device 13 is still intact, the governor switch device 10 will respond in the usual manner to the increase in the pressure of air in the reservoir 9 for which the switch device is set to effect operation of the auxiliary friction clutch apparatus to stop operation of the compressor 8. Thus, upon movement of the switch contact member 89 into engagement with contact elements 120, the magnet 69 of the magnet valve device is energized in the manner hereinbefore explained, whereupon the valve 75 is again moved to its unseated position for supplying compressed air to the piston chamber 46 of the actuator device 12. The piston 47 is thereby shifted to the position in which it is shown in Fig. 1, with the result that the driving member 25 of the clutch device 7 is withdrawn from frictional engagement with the associated rotor mounted on the compressor shaft 20.

It will thus be seen that the auxiliary friction clutch apparatus constructed in accordance with our invention may be associated with an electromagnetic or eddy current transmission system, the friction clutch elements being maintained in an inoperative state so long as the magnetic drive mechanism functions properly. The auxiliary friction clutch apparatus is designed to be rendered operative automatically upon accidental failure of the electrical elements of the magnetic transmission mechanism, after which the compressor is continued in operation under the control of the usual pressure governor device.

Having now described our invention, what we claim as new and desire to secure by Letters Patent, is:

1. In an electromagnetic transmission equipment, in combination, a driving member, a driven member normally spaced therefrom, electromagnetic drive means adapted normally to transmit magnetic torque between said driving member and said driven member, and auxiliary drive means responsive to deenergization of said electromagnetic drive means for effecting frictional engagement of said driving member and said driven member.

2. In an electromagnetic transmission equipment, in combination, a driven member, a rotary driving member normally spaced from said driven member and adapted to be shifted into frictional engagement therewith, electromagnetic drive means constructed and arranged normally to transmit magnetic torque from said driving member to said driven member, actuator means operable to shift said driving member into frictional engagement with said driven member, and electroresponsive means adapted to effect operation of said actuator means in response to the occurrence of a condition rendering said electromagnetic drive means inoperative.

3. In an electromagnetic transmission equipment, in combination, a driving member, a driven member, eddy current drive means for effecting operation of said driven member by said driving member, friction drive means also operable to effect operation of said driven member by said driving member, fluid pressure responsive means normally maintaining said friction drive means inoperative, and electroresponsive means cooperative with said eddy current drive means and operable upon failure thereof to cause operation of said fluid pressure responsive means for rendering said friction drive means operative.

4. In an electromagnetic transmission equipment, in combination, a driving member, a driven member, eddy current drive means adapted normally to transmit magnetic torque between said driving member and said driven member, friction drive means operable to effect mechanical operation of said driven member by said driving member, control means normally rendering said friction drive means inoperative, said control means being responsive to failure of said eddy current drive means to condition said friction drive means for operation, and common governor means operative to control either said eddy current drive means or said friction drive means to effect starting or stopping of said driven member.

5. Drive mechanism for associating a driving member and a driven member comprising, in combination, an eddy current clutch device adapted to establish a driving connection between the driving member and the driven member so as to provide a varying degree of slip of the driven member with respect to the driving member, electrical means controlled according to the operating speed of the driving member for so controlling the eddy current clutch as to cause the driven member to be operated at a substantially constant speed, auxiliary friction clutch means associated with said eddy current clutch device and constructed and arranged for automatic operation to establish a mechanical driving connection between the driving member and the driven member, and means cooperative with said electrical means to detect failure of said eddy current clutch device and responsive to such failure for initiating operation of said friction clutch means.

6. Drive mechanism for associating a driving means and a driven means comprising, in combination, an eddy current clutch device having a driving element driven according to the speed of the driving means, a driven element connected to the driven means, and two separate electromagnetic windings on one of said elements effective when energized to set up opposing flux forces, one of said windings being normally energized by a constant current while the other of said windings is normally energized by current varying in accordance with the speed of said driving means, auxiliary friction clutch means operable to establish a driving connection between said driving element and said driven element, and electroresponsive means operable in response to failure of both of said windings for effecting operation of said friction clutch means.

7. Drive mechanism for associating a driving means and a driven means comprising, in combination, an eddy current clutch device having a driving element driven according to the speed of the driving means, a driven element connected to the driven means, and two separate electromagnetic windings on one of said elements effective when energized to set up opposing flux forces, one of said windings being normally energized by a constant current while the other of said windings is normally energized by current varying in accordance with the speed of said driving means, auxiliary friction clutch means operable to establish a driving connection between said driving element and said driven element and electroresponsive means operative during energization of either or both of said windings for thereby withholding operation of said friction clutch means.

8. A transmission equipment for providing a driving connection between a driving member and a compressor, comprising in combination: an eddy current drive device having a driving element connected to the driving member, a driven element connected to the operating shaft of the compressor, and electromagnetic means on one of said elements for producing a magnetic flux interlocking the driving and driven elements; electrical means for controlling energization of said electromagnetic means; electropneumatic friction clutch operating means operable upon failure of said electrical means to establish a driving connection through which said compressor may be driven from said driving member; a reservoir adapted to be charged with fluid under pressure by said compressor; and fluid pressure responsive switch means subject to the pressure in said reservoir for controlling the circuits of said eddy current clutch device and said electropneumatic friction clutch means.

9. In an electromagnetic transmission equipment, in combination, a driving member, a driven member, eddy current drive means for effecting operation of said driven member by said driving member, friction drive means also operable to effect operation of said driven member by said driving member, control means electrically interlocked with said eddy current drive means and operable to detect failure thereof, and fluid pressure means controlled by said control means and operable thereby in response to such failure of said eddy current drive means for initiating operation of said friction drive means.

10. In an electromagnetic transmission equipment including a driving member, a driven member, eddy current drive means for effecting operation of said driven member by said driving member, and friction drive means also operable to effect operation of said driven member by said driving member, in combination, fluid pressure operated means for controlling said friction drive means, and electroresponsive valve means governed in accordance with energization of said eddy current drive means for controlling supply or release of fluid under pressure to or from said fluid pressure operated means.

PHILIP L. CRITTENDEN.
CLAUDE M. HINES.